No. 607,584. Patented July 19, 1898.
W. H. BINNS.
RETAINER FOR BALL BEARINGS.
(Application filed Aug. 23, 1897.)
(No Model.)
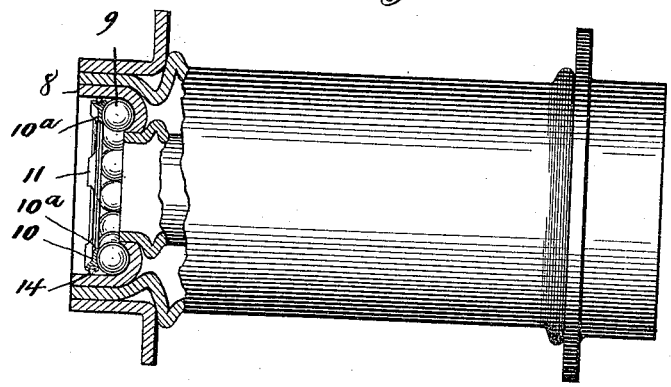
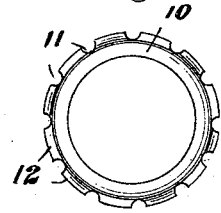  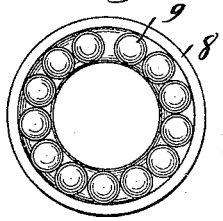 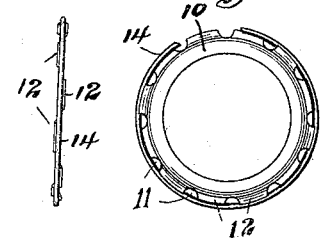
Witnesses,
D. Mann
Frederick J. Goodwin
Inventor,
William H. Binns
By Offield, Towle & Linthicum
Attys.
THE NORRIS PETERS CO., PHOTO-LITHO., WASHINGTON, D. C.

UNITED STATES PATENT OFFICE.

WILLIAM H. BINNS, OF CHICAGO, ILLINOIS.

RETAINER FOR BALL-BEARINGS.

SPECIFICATION forming part of Letters Patent No. 607,584, dated July 19, 1898.

Application filed August 23, 1897. Serial No. 649,120. (No model.)

*To all whom it may concern:*

Be it known that I, WILLIAM H. BINNS, of Chicago, Illinois, have invented certain new and useful Improvements in Retainers for Ball-Bearings, of which the following is a specification.

This invention relates to retainers for the balls of ball-bearings, and has for its object to provide a simple and effective device for holding the balls in place in their raceway when the bearing is taken apart, thereby preventing their being lost or displaced, and which will not interfere with the proper action of the balls when the bearing is assembled.

To this end the invention consists in a retainer having a body portion of fixed diameter and a separate elastic retaining ring or rim extending radially outward beyond the body and adapted to frictionally engage the wall of the bearing, whereby the body portion of the retainer is frictionally held in place against movement in either direction within the bearing.

In the accompanying drawings, Figure 1 is an elevation, partly in section, of a bearing embodying my invention in one form. Fig. 2 is an end view of the cup and balls within the retainer removed. Figs. 3 and 4 are respectively side and edge views of the complete retainer detached. Figs. 5 and 6 are similar views of the body portion or annulus detached, and Fig. 7 is a perspective view of the elastic retaining-ring detached.

In the said drawings, 8 represents the cup of a ball-bearing, said cup having a raceway therein to receive a set of balls 9. To hold these balls in place, I employ a retainer comprising an annulus or body portion 10 of fixed diameter, which is preferably made of thin sheet-steel and which has formed in its periphery a plurality of notches or slits 11, the portions of the outer margin of said annulus forming projections 12, which are alternately offset on opposite sides of the plane of the body of the annulus 10, forming between them a groove 13. The inner edge of the annulus 10 is desirably inwardly bent or flanged, as shown at 10ª, to better adapt the annulus to engage and retain the balls. The retainer also comprises an elastic or spring ring 14, which may be compressed to fit within the groove 13, formed by the alternately-offset projections 12. When the parts are thus assembled, the retainer may be inserted in its place in the bearing, as shown in Fig. 1, and the expansion of the spring-ring will cause a frictional engagement of the same with the inner wall of the bearing sufficient to hold the ring, and consequently the body portion or annulus, in proper position within the bearing.

Of course the strength of the elastic ring will be properly proportioned to the diameter of the bearing, the size of the balls, and to the other requirements of the particular case.

It will be observed that the elastic ring or rim extends radially outward beyond the body of the retainer and that its frictional engagement with the inner wall of the bearing, between which and the body it is interposed, prevents accidental movement of the retainer in either direction axially of the bearing, no shoulders or seats being required and the retainer being held in whatever position it is placed within the bearing with sufficient firmness to prevent the falling out of the balls.

It is obvious that various modifications in the details of the construction described and shown may be made without departing from the principle of my invention, and one such modification is set forth in an application filed by me March 22, 1897, Serial No. 628,557, in which the annulus or body portion of the retainer has a threaded periphery and the elastic ring is coiled or spiral. This latter construction is not specifically claimed by me in the present application, as it is claimed in my other application aforesaid.

I claim—

1. A retainer for ball-bearings comprising a body portion of fixed diameter, and a separate elastic retaining ring or rim located radially outward beyond said body portion, and adapted to be engaged between said body portion and the wall of the bearing, and by its frictional engagement prevent movement of the retainer in either direction, substantially as described.

2. A retainer of the class described comprising a body portion or annulus of fixed diameter, having a grooved periphery, and a separate expansible elastic ring engaging said grooved periphery extending radially outward beyond the body and adapted to frictionally engage the wall of the bearing and prevent lateral displacement of the retainer in either direction, substantially as described.

3. A retainer of the class described comprising a body portion or annulus of fixed diameter, having its periphery notched or slit, forming projections which are alternately offset relatively to the plane of the body of the annulus, and a separate expansible elastic ring adapted to engage said alternating projections, substantially as described.

WILLIAM H. BINNS.

Witnesses:
FREDERICK C. GOODWIN,
IRVINE MILLER.